United States Patent [19]
Föhl

[11] 4,317,263
[45] Mar. 2, 1982

[54] BELT LOCK FOR A SAFETY BELT

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 63,255

[22] Filed: Aug. 2, 1979

[30] Foreign Application Priority Data

Aug. 22, 1978 [DE] Fed. Rep. of Germany ....... 2836748

[51] Int. Cl.³ .................... A44B 11/26; A44B 19/00
[52] U.S. Cl. .............................................. 24/230 AT
[58] Field of Search ..... 24/230 AP, 230 TC, 230 AS, 24/230 AT, 230 A, 230 AK

[56] References Cited
FOREIGN PATENT DOCUMENTS 961628  1/1975  Canada ......................... 24/230 AT
2060789 6/1972  Fed. Rep. of Germany ........ 24/230 AT
2065866 6/1977  Fed. Rep. of Germany ........ 24/230 AT Primary Examiner—Alexander Grosz
Attorney, Agent, or Firm—Herbert L. Lerner

[57] ABSTRACT

Belt lock for a safety belt with a spring-operated locking catch with hooked part engaging a plug-in tongue. A hand-operated member has a locking part in fixed connection. The locking part is disposed in the path of motion of the hooked part preventing release of the tongue unless the member is pressed by hand to move the locking part out of the path of motion. The locking part is movable along the plug-in axis; and the locking part in the closed position couples with the locking catch.

14 Claims, 5 Drawing Figures

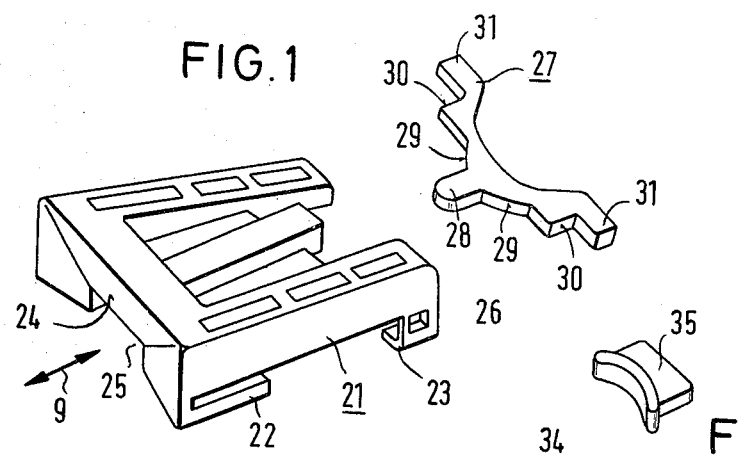
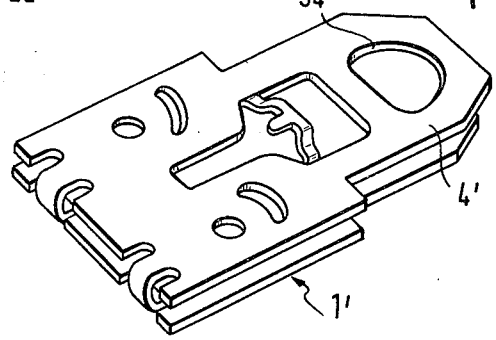
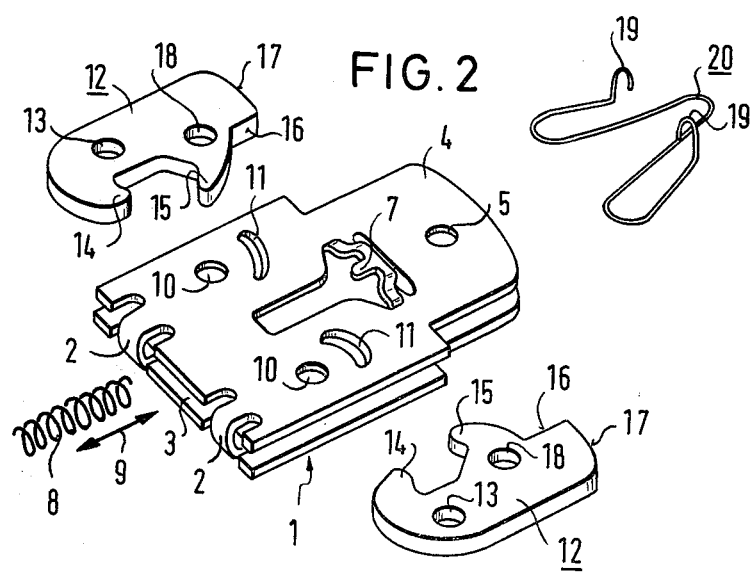

BELT LOCK FOR A SAFETY BELT

BACKGROUND OF THE INVENTION

1. Field of the Invention

The invention relates to a belt lock for a safety belt with at least one spring-operated locking catch (hook) which locks with a plug-in tongue which is preferably fastened at the free end of the belt and wherein the tongue is detachable from the belt lock by means of a hand-operated member that operates the locking catch.

2. Description of the Prior Art

In known arrangements for the detachable arresting of a plug-in tongue which can be, for example, secured at the free end of a safety belt which, for example operates with a belt lock which is secured to the frame of the vehicle, there is provided an operating element in the form of a press-in button (release) which works in conjunction with the locking catch in such manner that the locking catch which is interlocked in a cut-out of the tongue, is movable for opening from the locked position essentially perpendicularly to the insertion direction of the tongue, and thereby moves outside of the locking position. It is particularly disadvantageous that the locking connection of this type has a rather great amount of play and also has a tendency to chatter in an annoying manner. Furthermore, the known devices are relatively costly with respect to their construction and assembly procedure.

SUMMARY OF THE INVENTION

An object of the present invention is to provide a belt lock of the mentioned type which will function reliably, arresting the plug-in tongue in the belt lock without play and is of simple construction.

With the foregoing and other objects in view, there is provided in accordance with the invention a belt lock for a safety belt with a plug-in opening for the insertion of a plug-in tongue fastened to the belt, a spring-operated locking catch with a hooked part in the belt lock engaging the plug-in tongue when inserted in the plug-in opening of the belt lock, a hand-operated member movable against the force of a spring for operating the locking catch to detach the tongue from the belt lock, a locking part in fixed connection with the hand-operated member, wherein in the locked position of the belt lock, the locking part is disposed in the path of motion of the hooked part preventing the latter from disengaging the tongue, and wherein when the hand-operated member is moved against the force of said spring, the locking part in fixed connection with the hand-operated member is also moved out of the path of motion of the hooked part permitting the hooked part to become disengaged from the tongue, and the tongue to detach from the belt lock.

Other features which are considered as characteristic for the invention are set forth in the appended claims.

Although the invention is illustrated and described herein as embodied in a belt lock for a safety belt, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 is the release body and locking part of the belt lock according to the invention in an exploded view, FIG. 2 is the bracket, locking catches, and springs of the belt lock according to the invention, also in an exploded view, FIG. 3 is a bracket, slightly modified, with respect to the construction of the bracket of FIG. 2, and FIGS. 4 and 5 show the belt lock containing the functional assemblies according to FIGS. 1 and 2, in two different operating positions.

DETAILED DESCRIPTION OF THE INVENTION

Figure 4:
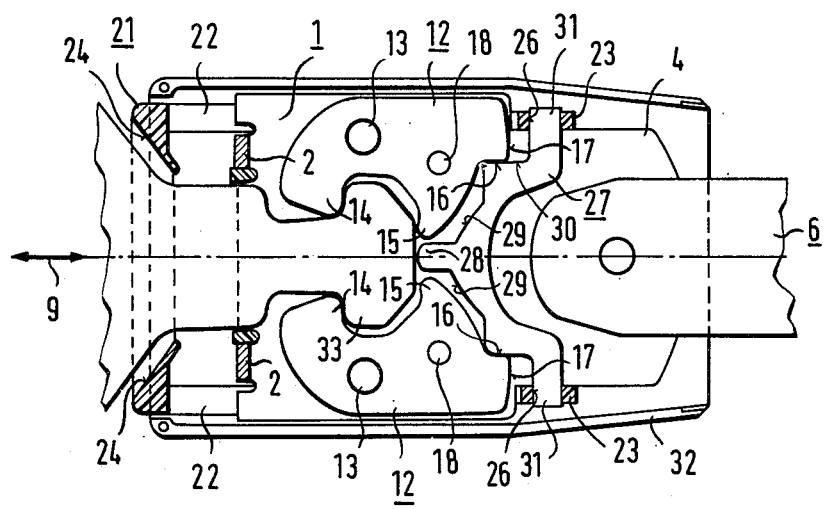

In accordance with the invention, a locking member is in fixed connection with an operating member which is movable against a spring force. The locking member locks the locking catch by interfering in its path of motion in the locking position and thereby presses the plug-in tongue with spring action against the hook-part of the locking catch. Preferably, one or two locking catches which are symmetrically arranged on both sides of the plug-in axis, together with the hooked parts of the tongue, are provided with pressure parts in the form of claws. The claws work together with a front-sided pressure surface of the plug-in tongue for moving the locking catch into the lock position, or to throw the plug-in tongue out of the lock position. By the joint action of the locking catch and the locking member, according to the invention, arresting the tongue which is plugged into the belt lock with no play of the tongue is assured. A particularly simple construction results from the fact that the locking part is rigidly connected with the operating member which is preferably made in the form of a press-in release and assumes, by the motion of the latter, either an open or closed position.

According to an advantageous embodiment of the invention, the one or two locking catches are in the form of two-armed hingeable levers which either are provided with a hook-part or have a projection which butts in the locked position against a locking shoulder of the locking member.

A particularly simple construction of the belt lock results if the locking catch and the locking member are disposed, or guided in a U-shaped bracket, formed as a one-piece stamped part which has at its front-side a plug-in opening for the plug-in tongue. This flat support bracket which can be very economically manufactured, also serves for guiding a press-in member which is hand-operable.

Further advantageous details of the invention will be explained with the aid of sample embodiments shown in the drawings and described in the following.

Figure 5:
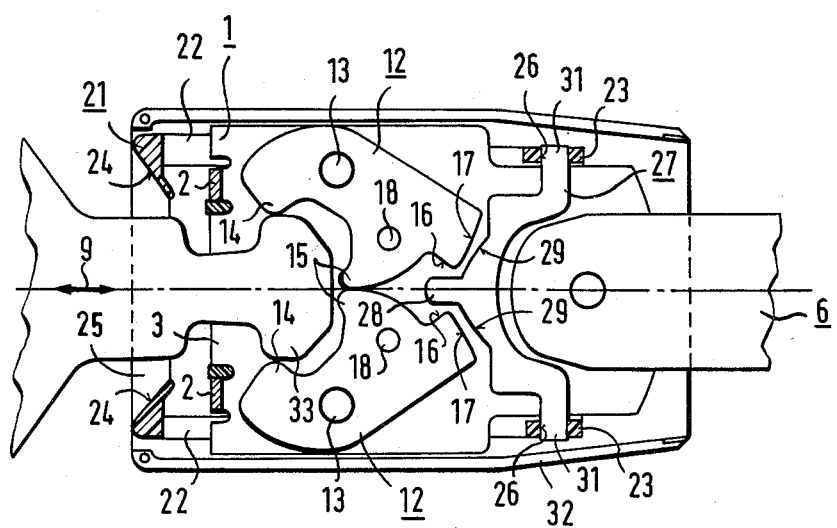

In the sample embodiment according to FIGS. 1, 2, 4 and 5, a metallic bracket 1 is made as a one-piece stamped part, bent in a U-shaped form and has a plug-in opening 3 between its connecting legs 2. The flat bracket 1 has a reduced projection 4 with securing means 5 which are represented in the embodiment as a bore for securing a rail-type lock carrier 6. The bracket 1 is also provided with a bent up projection 7 for supporting a spring 8, and furthermore has symmetrically placed bearing bores (holes) 10 at both sides of the plug-in axis 9, and also slot shaped cut outs 11. Two locking catches 12 are hingeably supported at both sides of the plug-in axis 9 with suitable bearing pins in the bearing bores 10 between the two plates of the U-bend of bracket 1. The locking catches 12 are two armed hingeable levers on one side of the pivot axis 13 (bearing bore) with a hooked part 14, and at the other side of the pivot axis 13 with a nose shaped pressure part 15, with the hooked part 14 and the pressure part 15 forming a claw. Furthermore, each locking catch 12 has a stop 16 adjacent to the pressure part 15, and adjacent to the latter slightly rounded contact edges 17. The locking catches 12 have holes or bores 18 for securing the free spring legs 19 of a spreading spring 20 which is common to both locking catches 12. Both locking catches 12 are pressed into opening position by means of the spreading spring 20, as shown in FIG. 5.

The functional assembly, shown in detail in FIG. 1, consists of a release (key) body 21 made of a synthetic material. Release body 21 has at its underside, on both sides, guide projections 22 and 23, as well as a pressure surface 24 at its front side which is pulled in to form a plug-in opening 25, similar to a funnel, as is clearly shown in FIG. 1. A metallic locking part 27 is rigidly supported in the guide opening 26, at the rear side of the release (key) body 21. The locking part 27 is provided with a pressure nose 28 centrally located along the push-in axis 9 which nose has slightly rounded edges 29 and adjacent locking shoulders 30. The locking part 27 is rigidly supported with its side support projections 31 in the guide openings 26 of the release (key) body 21.

As is illustrated in FIGS. 4 and 5, the release (key) body 21 which includes the locking part 27 as a rigid member is slidably supported in the U-shaped bracket 1 by means of the guide projections 23 and 23. As a result, the release (key) body 21 is pressed by spring 8 (FIG. 2) towards the front side of the bracket 1. The support body, or the bracket 1 itself is rigidly supported in a housing 32 which, in the embodiment, is formed by two shells made of synthetic material of which only the lower housing shell is shown in FIGS. 4 and 5. The housing 32 is open toward the front and back side. The free end of plug-in tongue 33, widens and can be fastened, for example, to the free end of the belt.

In FIG. 5, the belt lock is shown in the open position i.e. in the non-operating position. The locking catches 12 are pressed against each other by the spreading spring 20 in such manner that their pressure parts 15 butt against each other along the plug-in axis 9 and their hook-parts 14 are so far apart that the plug-in tongue 33 may be inserted between the hook-parts 14. The locking part 27 which is rigidly connected with the release (key) body 21, is in a position in which its stop edges 29 bank with their area at the contact edges 17 of the locking catches 12, with the pressure nose 28 of locking part 27 extending to a certain measure between the locking catches 12. Now, if the plug-in tongue 33 is inserted between the locking catches 12 through the plug-in opening 3 of the bracket 1 and through the plug-in opening 25 of the release (key) body 21, then the front side of the plug-in tongue 33 first meets the pressure parts 15 of the locking claws 12 which are at this point pushed together. By further motion of the plug-in tongue 33, the locking catches 12 are symmetrically hinged toward the outside against the force of the spreading spring 20, as shown in FIG. 4, in which position the hook parts 14 and the pressure parts 15 enclose claw-like the expanded end of the push-in tongue 33. During the hinge-motion, the spring-loaded locking part 27 of the release (key) body 21 becomes free at its front side and reaches the locking position shown in FIG. 4 in which the stops 16 butt against the locking shoulders 30 of the locking part 27 whereby the locking catches are prevented from moving into the opened position. The pressure nose 28 of locking part 27 extends between the pressure parts 15 of the locking catches 12 and presses the locking tongue 33 by spring action against the hook parts 14 of the locking catches 12. Thereby, the plug-in tongue 33 is arrested within the belt lock. To detach the plug-in tongue 33, the release (key) body 21 is pressed at its pressure surface 24 into the inside of the housing 32 to a position whereby, when the outer limit of the pressure area 24 is within the housing 32, the locking position of the locking shoulder 30 and the stops 16 is freed, so that the locking catches 12 can hinge toward the inside into the position shown in FIG. 5 causing the plug-in tongue 33 to be thrown out of the housing 32 by means of the pressure parts 15. The relative position of bracket 1, release (key) body 21 and the housing 32 is so chosen that, in the opened position of the belt lock, the outer limit of the grip surface, or, pressure surface 24 of the release key body 21 is in the height of the front wall (limit) of the housing 32, i.e. the body 21 extends flush with housing 32. In the locked position, according to FIG. 4, the outer limit of the release key body 21 extends slightly from the housing 32.

The insertion of the plug-in tongue 33 is facilitated by the funnel-like profile of the pressure surface 24 which serves to center the tongue with respect to the plug-in opening.

In the embodiment according to FIG. 3, bracket 1' is slightly modified with respect to its tapered projection 4' in which a relatively large opening 34 is provided. The free end of a belt can be fastened in opening 34, for example, by interposing an insertion piece 35.

There are claimed:

1. Belt lock for a safety belt with a plug-in opening for the insertion of a plug-in tongue fastened to the belt, a spring-operated locking catch with a hooked part in the belt lock engaging the plug-in tongue when inserted in the plug-in opening of the belt lock, a hand-operated member movable against the force of a spring for operating the locking catch to detach the tongue from the belt lock, a locking part in fixed connection with the hand-operated member, wherein in the locked position of the belt lock, the locking part is disposed in the path of motion of the hooked part preventing the latter from disengaging the tongue, and wherein the locking part presses the plug-in tongue by spring action against the hooked part of the locking catch and wherein when the hand-operated member is moved against the force of said spring, the locking part in fixed connection with the hand-operated member is also moved out of the path of motion of the hooked part permitting the hooked part to become disengaged from the tongue, and the tongue to detach from the belt lock.

2. Belt lock according to claim 1, wherein two locking catches which are arranged symmetrically on both sides of the plug-in axis, are hingeably supported, and tensioned by spring action in the direction of the opened position, and wherein the locking part is movable along the plug-in axis and is by spring action tensioned in a direction opposite to insertion path of the plug-in tongue, and said locking part in the locked position couples with the locking catches.

3. Belt lock according to claim 1, wherein a locking catch is hingeably supported, and tensioned by spring action in the direction of the opened position, and wherein the locking part is movable along the plug-in axis, and is by spring action tensioned in a direction opposite to insertion path of the plug-in tongue, and said locking part in the locked position couples with the locking catch.

4. Belt lock according to claim 2, wherein the locking catches are formed as two armed swing-levers, which are provided with a hooked part and with a stop which butts in the locked position against a locking shoulder of the locking part.

5. Belt lock according to claim 3, wherein the locking catch is formed as a two armed swing-lever, which is provided with a hooked part and with a stop which butts in the locked position against a locking shoulder of the locking part.

6. Belt lock according to claim 4, wherein the locking catches, together with the hooked parts have pressure parts and form claws which enclose the plug-in tongue, and said pressure parts work together with a front-side pressure surface of the plug-in tongue for moving the locking catches into the lock position, respectively for throwing the plug-in tongue out of the lock position.

7. Belt lock according to claim 5, wherein the locking part has stop edges disposed at both sides of a pressure nose which is positioned on the plug-in axis and wherein in the opened position of the lock, the locking part is banked against associated contact edges of the locking catch by said stop edges by spring action.

8. Belt lock according to claim 6, wherein the locking part has stop edges disposed at both sides of a pressure nose which is positioned on the plug-in axis and wherein in the opened position of the lock, the locking part is banked against associated contact edges of the locking catch by said stop edges by spring action.

9. Belt lock according to claim 1, wherein the locking catches and the locking part are disposed in a U-shaped bracket, which is made as a one-piece stamped part, and said bracket is provided at its front-side with a plug-in opening for the plug-in tongue.

10. Belt lock according to claim 9, wherein a release body is disposed in the U-shaped bracket, said release body is in a fixed connection with the locking part, and is made slidably in the direction of the plug-in axis, opposed by the force of spring.

11. Belt lock according to claim 10, wherein the bracket is rigidly supported in a housing which is open on the plug-in side, and the release body is provided with a pressure surface against which manual pressure may be applied, which is essentially aligned with the housing wall at the plug-in side, and occupies the area of the housing opening with exception of the plug-in opening.

12. Belt lock according to claim 11, wherein the pressure surface has a profile that is funnel-shaped, and pulled-in toward the direction of the plug-in opening for the plug-in tongue.

13. Belt lock according to claim 9, wherein, at the free end of the U-shaped bracket, opposite the plug-in opening, a fastening area is provided for a rigid lock carrier.

14. Belt lock according to claim 9, wherein, at the free end of the U-shaped bracket, opposite the plug-in opening, a fastening area is provided for the fastening of a belt strap.

* * * * *